July 27, 1965  J. J. POWELL  3,197,225
COLLAPSIBLE SHOPPING CART
Filed Aug. 13, 1963  2 Sheets-Sheet 2

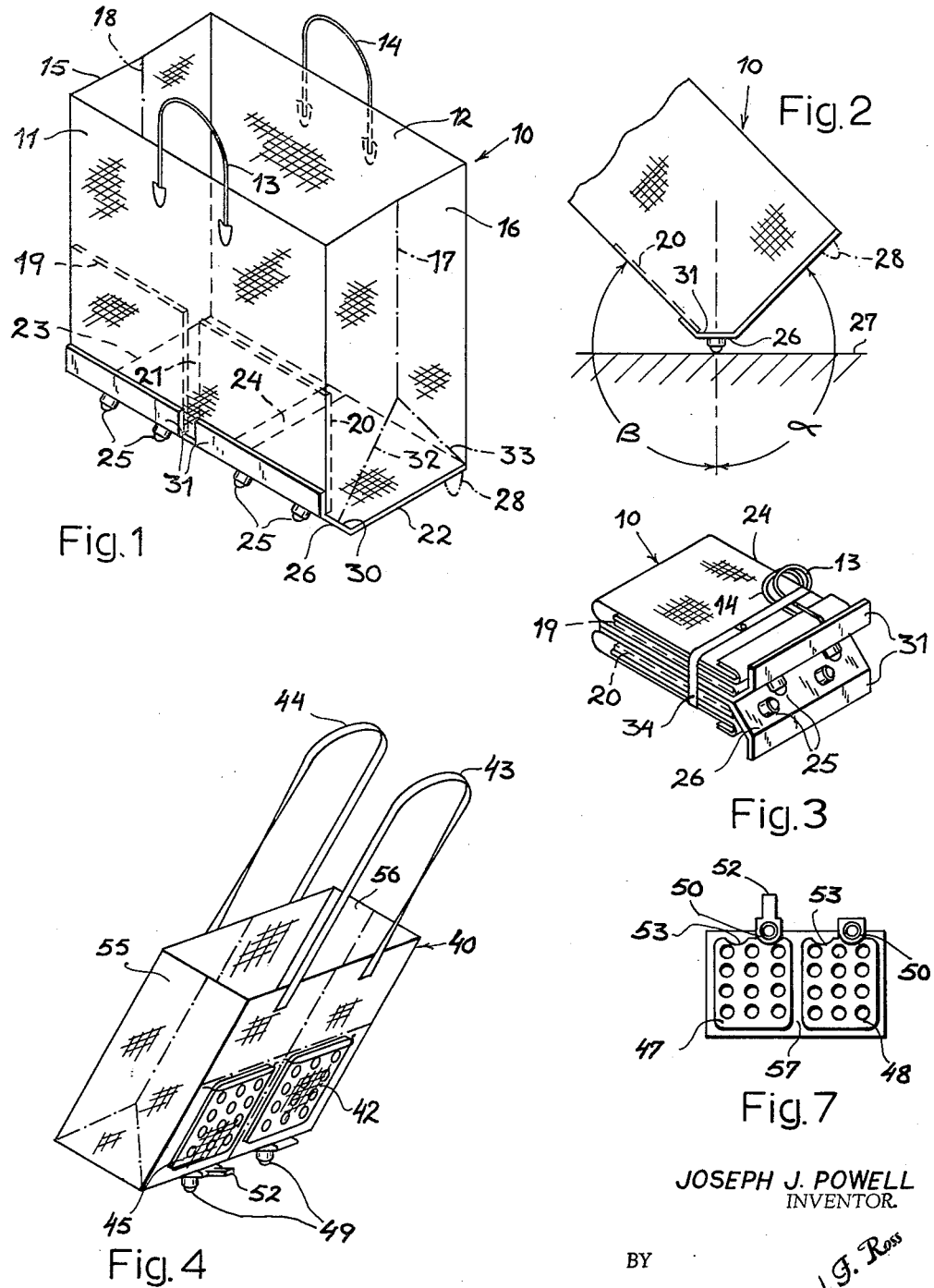

JOSEPH J. POWELL
INVENTOR.

BY
Karl G. Ross
AGENT 3,197,225
COLLAPSIBLE SHOPPING CART
Joseph J. Powell, 87—50 Kingston Place, Jamaica,
Long Island, N.Y.
Filed Aug. 13, 1963, Ser. No. 301,779
13 Claims. (Cl. 280—36)

My present invention relates to a collapsible shopping cart of compact size but relatively large capacity and adapted to be folded into a relatively small unit capable of being carried in a handbag or elsewhere on the person.

While it is known to provide shopping carts which can be folded or collapsed into compact units for storage, such devices generally fall into two major categories. Firstly, there are those constructed with wire frames whose sides and bottoms are hingedly interconnected so that, for example, the bottom can be raised so as to lie parallel with the back of the cart while the front of the cart can be swung to overlie the back. This unit is suitable for storage in closets or the like but is insufficiently compact for carrying on the person. Secondly, it has been proposed to provide flexible carrying bags or the like with wheels or casters permitting them to rest upon the ground and be drawn therealong when filled with articles. It has been found that devices of this latter type had many disadvantages which prevent them from gaining widespread acceptance. The primary disadvantage of flexible-bag shopping carts was that no adequate support for the articles was provided. Thus, when heavy packages, cans or the like, were placed in the shopping cart, the flexible wall portion thereof tended to sag and drag upon the ground. Moreover, these units were frequently provided with four wheels or casters by which the cart rested upon the ground and which permitted the cart to be drawn therealong only in a fully upright condition, i.e. one in which the walls of the cart were perpendicular to the ground level. Not only was this position awkward for the displacement of heavy objects, but additional disadvantages arising from the unmaneuverability of the cart arose. On the one hand, the wheels were generally permanently oriented so that the cart could be drawn along only in the direction of one of its lateral sides with the front and rear walls parallel to the direction of movement, thereby multiplying the moment of force applied by the weight of the load about each lateral edge of the cart; the tilting of it for greater maneuverability was severly limited if not entirely prevented by this construction. On the other hand, the height of the individual was a factor in the handling of such carts. A further disadvantage of units of this type was that they could not readily be folded into a neat and compact package adapted to be carried, for example, in the hand of a user, in a handbag or coat pocket.

It is, therefore, the object of the present invention to provide an improved collapsible shopping cart wherein the aforementioned disadvantages are obviated.

It is another object of this invention to provide a lightweight shopping cart of this type which can be folded simply and rapidly into a package sufficiently small as to be transportable in a handbag or coat pocket and yet capable of withstanding relatively heavy loads without undue sagging and dragging upon the ground.

A further object of this invention is to provide a collapsible shopping cart which is highly maneuverable and suitable for use by persons of substantially any height with ease and yet has the large capacity and load-carrying capabilities of earlier shopping cart structures.

This and other objects of the present invention, which will become apparent hereinafter, are attained in accordance with the present invention, by providing the receptacle-forming means of a shopping cart of flexible sheet material (preferably a textile fabric of natural or synthetic material) whose bottom portion is affixed to a relatively rigid planar bottom member while another relatively rigid wall support member is provided along one of the upright surfaces of the cart in its open or load-carrying condition. The wall-support member extends substantially perpendicular to the bottom member and is hinged for displacement relatively thereto by a web of the flexible sheet material so that it can overlie this bottom member in a collapsed condition of the cart with at least part of the sheet material, constituting the receptacle thereof, sandwiched between these two members. At least one of these members is provided with friction-reducing roller means projecting outwardly from the cart along the adjoining edges of the two members, the roller means including with edges of the plates an external, substantially obtuse angle of, preferably, 135° so that the cart can be tilted through an angle of about 45° for drawing along the ground. In this case, a vertical plane through the roller means can pass through the center of gravity of the major part of the load carried by the cart. The roller means can be provided upon integral portions of the members bent through an angle of, say, 45° to produce an appendage to which the roller means, i.e. nonswivelable rollers, ball casters or swivelable roller casters, can be secured with a common axial plane of the roller means perpendicular to the plane of the mounting appendage.

Surprisingly, it has been found that the wall-support member limits sagging of the flexible sheet material at the base of the shopping cart when the latter is tilted through an angle of 45° even though this member does not abut directly against the bottom member and is joined thereto only by a web of flexible material. To limit strain at the mutually adjacent edges of these support members and the web joining them, it may, however, be desirable to provide one of these members with an abutment surface outwardly of the other member and engageable therewith upon loading of the cart.

While the support members are best constructed from plates of a lightweight rigid sheet material such as aluminum and these plates can be stitched to a fabric (e.g. nylon) bag, it should be noted that the support members can also be wire frames or the like. Either of the support members can, instead of being stitched to the fabric, joined thereto via rivets, bolts and the like or received within pockets in the fabric or be bonded thereto with the aid of an adhesive or by thermal welding (e.g. as is the case when a polymeric fabric and synthetic resin support members are used). It should be noted that best results are obtained when the bag of sheet material has a rectangular prismatic configuration since, in this case, the lateral wall portions of this bag serve to prevent displacement of the wall-support member through an angle substantially in excess of 90° when a load is carried by the device. Advantageously, the roller means can project only limitedly beyond the support members so that the base plate forms a relatively flat supporting surface for the open cart when articles are to be placed therein.

To facilitate folding of the cart, both the wall-support members and the bottom-support members can be provided from two independent generally rectangular portions which are hinged together along their juxtaposed edges preferably by a web of flexible sheet material. Since these adjoining edges extend perpendicularly to that between the wall support and bottom support means, part of the bag fabric can be folded initially between these means whereupon they are swung together and then folded about hinge means formed by the web between the two portions of each member. It is thus possible to obtain a shopping cart whose collapsed dimensions are similar to those of a wallet or book, especially when nonbulky fabrics are used. The roller means may be provided symmetrically on each individual portion of the respective support plate, these supports being formed with recesses or the like for clearing the roller means of the other portion in a collapsed condition of the cart, thereby preventing the roller means from increasing the dimensions of the package to an inordinate degree. Since, when the bottom plate rests flat upon the ground, it may be difficult to tilt a loaded cart constructed in accordance with the present invention, these plates can be provided along their edges remote from and parallel to those along which the roller means are provided with ground-engaging formations elevating these rear parts to facilitate tilting of the cart. The fabric preferably is composed of mesh material such as a narrow- or wide-mesh netting and is provided with handles along its upper edge at the front and rear walls of the bag.

The above and other objects, features and advantages of the present invention will become more readily apparent from the following description reference being made to the appended drawing in which:

FIG. 1 is a perspective view of a shopping cart according to one aspect of the present invention in an upright condition to receive the articles to be carried therein;

FIG. 2 is a side-elevational view of this shopping cart in a tilted position permitting displacement thereof along the grounds;

FIG. 3 is an end view of the cart in a folded condition;

FIG. 4 is a perspective view similar to FIG. 1 showing a modified cart;

FIG. 7 is a bottom view of the shopping cart;

Figure 5:
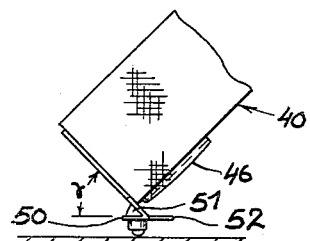
FIG. 5 is an end-elevational view of this cart in a tilted position wherein it may be displaced along the ground.

From FIGS. 1–3 of the drawing, it can be seen that a collapsible cart, according to the present invention, can comprise a nylon mesh bag 10 whose front and rear walls 11, 12, respectively, are provided with handles 13, 14 along their upper edges. These walls 11, 12 may be integral with lateral walls 15, 16 at the corners of the rectangular prismatic bag 10 while seams 17, 18 can be provided to form these lateral walls and suitable fold lines therein. As can best be noted in FIGS. 1 and 2, relatively rigid support means such as a pair of wall-support plates 19, 20 are secured to front wall 11 with lateral spacing so that a web 21 of flexible material forms a hinge between the juxtaposed edges of these plates. In the embodiment shown, the plates 19, 20 are provided interiorly of bag 10 although they can also be stitched to the exterior thereof as required. In this case, the plates are composed of a light-weight sheet metal such as aluminum which is provided with holes not shown by means of which it is secured to the bag via stitching or rivetting in a manner well-known per se. It should be noted, however, that the wall- and bottom-support members can also be composed of a synthetic resin or another material relatively rigid with respect to the flexible sheet material constituting the back. An example of a relatively rigid material which can be stitched through to the back is a heavy-gauge stiff leather. Along the bottom of bag 10, I provide a pair of laterally spaced base plates 22, 23 constituting the base-support means, these plates being hingedly interconnected along their juxtaposed edges by a web 24 of the sheet material (see FIG. 3). Roller means in the form of ball casters 25 of relatively small axial dimensions are affixed to the bottom-support members 22, 23 along angularly bent portions 26 thereof. These portions 26 can be bent through an angle of 45° with respect to the remainder of the plate and have the ball casters secured to them by riveting, bolting, welding, pin-clenching or the like with the axes of the ball casters extending perpendicularly to the bent portions or appendages 26 of plates 22 and 23. It is apparent, therefore, that the ball casters project from the cart and include angle $\alpha$ and $\beta$ with the bottom support means 22, 23 and the wall-support means 19, 20 respectively, of approximately 135° so that when the cart is tilted into its position shown in FIG. 2, it can be drawn along the ground 27 with a major part of the load contained in the bag concentrated vertically above the casters. The latter advantageously project axially by a relatively small distance so that the plates 22, 23 can rest flat against the ground to facilitate filling of the cart (FIG. 1) although pedestals 28 can also be provided to tilt these plates somewhat forwardly and facilitate displacement of the cart into the position shown in FIG. 2. While the fabric connection 30 between the wall-supporting plates 19 and 20 and the bottom-supporting plates 22 and 23 is normally sufficient to prevent sagging of the wall plates under the weight of the load during displacement of the cart, it should be noted that it is also possible to provide abutment surfaces 31 upon the base plates so that the wall plates can rest thereagainst and be mechanically supported thereby. In collapsing the cart, the flexible bag 10 can be folded along seam 17 and seams 32, 33 (FIG. 1) so that the major portion of the fabric is received between plates 19, 20 and plates 22, 23, whereupon plates 19 and 20 are folded down over the fabric into a position in which it overlies the base plates. The unit is then folded about hinge webs 21, 24 into the position shown in FIG. 3 wherein a retaining member such as a strip 34 with suitable snaps holding the unit in a compact package approximately the size of a wallet or book.

In FIGS. 4–8 I show a modified device wherein the flexible bag 40 is of limited height and is provided with relatively long handles 43, 44. In this case, the handles were approximately 18 inches in effective length while the bag had a height also of about 18 inches. It should be noted that this reduction in height of the bag does not materially reduce its capacity since articles can be stacked even externally of the bag and held in place between the handles. Additionally, paper bags and the like which extend higher than bag 40 can be used as supplementary, disposable receptacles.

Not only is the device of the instant embodiment more compact than that of FIGS. 1 and 2 as a consequence of the fact that less fabric is employed, but material advantages in handling are also obtained. For example, a short person need only grip the handles at a lower point when tilting the unit into the position shown in FIG. 5 for displacement, while a tall person can grasp the handles at their ends for drawing it with ease. In this case, the perforated aluminum or steel grids constituting the wall support plates 42, 45 are received within pockets 46 stitched into the fabric bag 40.

Figure 6:
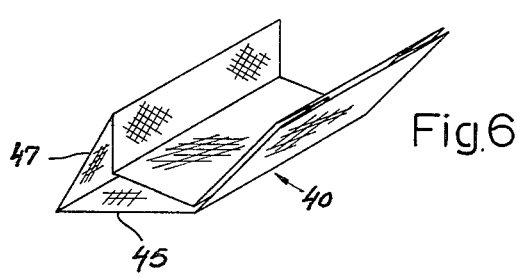
FIG. 6 is a somewhat diagrammatic perspective view schematically illustrating an initial step in the folding of the shopping carts of FIGS. 4 and 5.

The bottom plates 47, 48 (FIG. 7) can likewise be received in such pockets or merely joined to the base of the bag as previously described. In this case, both of the support members are external of the bag 40. The casters 49 are secured to inwardly bent appendages 50 integral with the base plates 47, 48, these appendages including an angle $\gamma$ of about 45° with their respective plates so that the axes of the ball casters extend in a vertical plane along which most of the weight carried by the cart is concentrated (FIG. 5). A fillet 51 of weldment may be disposed between the appendage of the remainder of the plate for additional support while a projection 52 can be formed on one or both plates to facilitate tilting of the cart. The user merely is required to step upon this projection 52 to swing the cart into the position shown in FIG. 5. Both of the bottom plates 47, 48 are provided with cutouts or recesses 53 adapted to receive the caster portion 50 of the other plate when the device is folded as will be described hereinafter. The fold lines for the fabric bag 40 are shown in dot-dash lines in FIG. 4. When it is desired to collapse the unit, the lateral walls 55, 56 of the bag are folded inwardly whereupon the upper portion of this bag is then folded into a position in which it overlies the base plates 47, 48 (FIG. 6). The wall-supporting plates 42, 45 are then folded onto this portion of the bag to produce the package illustrated in FIG. 7 whereupon the base plates 47, 48 are folded about their fabric hinge 57 into the condition shown in FIG. 9 via the folding step illustrated in FIG. 8. A strap 59 provided with a buckle or constituted of elastic material can be used to hold the folded package in place.

Figure 11:
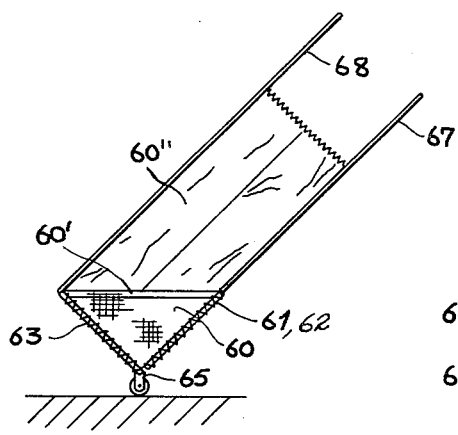
FIG. 11 is a side-elevational view of the embodiment of FIG. 10.
Figure 10:
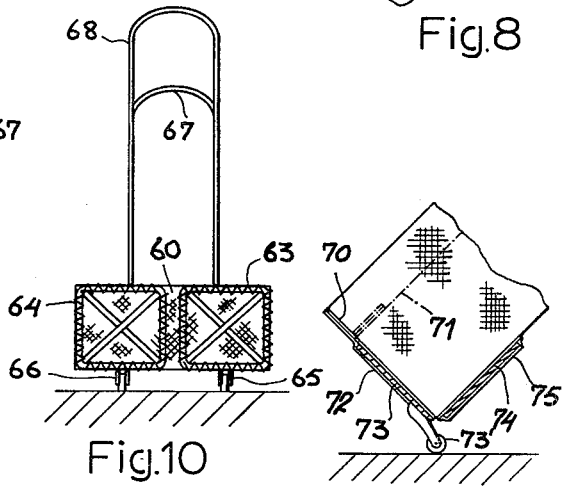
FIG. 10 is a rear-elevational view illustrating another modification.

In FIGS. 10 and 11 I show a modified device wherein the bag 60 is cut away and is sufficient just to hold the front-supporting members 61, 62 and the bottom-supporting members 63, 64 in place and serve as fabric hinges for these members. In this case the members are bent wire frames welded into rectangular configuration as can be seen in FIG. 10 and stitched in place. The roller casters can be secured to appendages 65, 66 of the wall support frames 61, 62, care being taken that the vertical axial plane through the caster axes extend substantially at an exterior angle of 135° with respect to these support frames (FIG. 11). The device can be folded in a similar manner into a highly compact package, the handles 67, 68 serving to hold articles upon the support plates since most of the fabric bag is here dispensed with. A reinforced band, strip or strap 60' may supplement the fabric 60 in holding the plates at a right angle in the loaded condition of the device. This structure is particularly suitable for carrying articles received within other receptacles such as a paper bag 60'' or a cardboard box.

Figure 9:
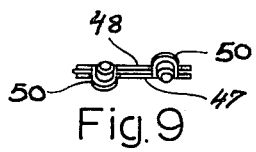
FIG. 9 is an end view of the folded package.
Figure 8:
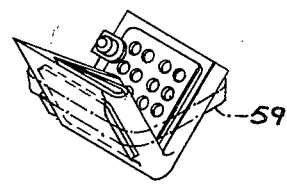
FIG. 8 is a perspective view illustrating a further stage of folding of the cart.

As indicated in FIGS. 7 and 9, the roller of each of the plates are received within recesses of the other for greater compactness. It is also possible, however, to achieve a compact package without using recesses merely by offsetting the rollers with respect to a median plane (FIG. 7), or when a plurality of rollers is provided on each plate as is the case with the embodiment of FIGS. 1 and 2, to space the casters of, say, plate 23 relatively widely while those of plate 22 are relatively closely spaced. Similarly the embodiment of FIGS. 10 and 11 can have its rollers offset as is the case with the devices of FIGS. 4 and 5.

Figure 12:
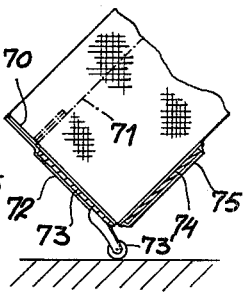
FIG. 12 is a vertical cross-sectional view through another cart, according to the invention.
Figure 13:
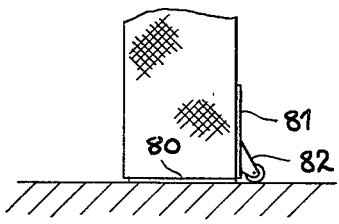
FIG. 13 is a side-elevational view of still another modification.

In the modification of FIG. 12, the bottom plates 73, to which the nonswivelable roller casters 73' are affixed, are enclosed in reinforced portions 72 of the fabric bag. The reinforced portions 72 extend rearwardly to form a flap 70 constituting part of the cart bottom when the device is filled with articles. If, however, the cart is not filled, it is found to be somewhat difficult to tilt the unit into its operative position illustrated. The user then draws the rear wall of the fabric receptacle upwardly to swing flap 70 into its dot-dash position 71, thereby shifting the articles forwardly against the front plates 74 in their reinforced enclosures 75 and aiding in the tilting of the cart. The cart of FIG. 13 demonstrates that the roller casters 82 are mounted on the front plates 81 while the bottom plates 80 are planar and can be flush with the ground. Casters 82 can be tangent to the plane of plates 80 along their lower portions so that these casters can support the front plates, during loading, at a right angle to the bottom plates. This structure also limits the tendency of the load to twist the casters out of their proper positions.

The invention described and illustrated is believed to permit of many modifications within the ability of persons skilled in the art, all such modifications being considered within the spirit and scope of the appended claims.

What is claimed is:

1. A foldable shopping cart, comprising receptacle-forming means of flexible material having a bottom portion and at least one wall portion connected with said bottom portion; a generally planar bottom-support member of relatively rigid material secured to said flexible material along said bottom portion; a generally planar wall-support member of relatively rigid material secured to said flexible material along said wall portion, said member being hingedly interconnected along said edge for relative displacement into a position wherein one of said members overlies the other of said members; and roller means affixed to one of said members and lying substantially along said edge outwardly of said receptacle-forming means, each of said members being subdivided perpendicularly of said edge into at least two hingedly interconnected support portions foldable into superposed relationship.

2. A foldable shopping cart, comprising receptacle-forming means of flexible sheet material having a bottom portion and at least one wall portion connected with said bottom portion along a common edge; a generally planar bottom-support member of relatively rigid material secured to said sheet material along said bottom portion; a generally planar wall-support member of relatively rigid material secured to said sheet material along said wall portion, said members being hingedly interconnected along said edge for relative displacement into a position wherein one of said members overlies the other of said members, said receptacle-forming means being formed with webs of said sheet material laterally of said members for limiting displacement of said members away from each other beyond a position wherein said members include an angle of substantially 90°; and roller means affixed to one of said members and lying substantially along said edge while projecting outwardly of said receptacle-forming means at an obtuse external angle to the member of which it is affixed, each of said members being subdivided perpendicularly of said edge into at least two hingedly interconnected support portions foldable into superposed relationship.

3. A shopping cart as defined in claim 2 wherein said members and the respective portions thereof are hingedly interconnected substantially only by webs of said sheet material.

4. A shopping cart as defined in claim 3 wherein said sheet material is a fabric.

5. A shopping cart as defined in claim 4 wherein said fabric is an open mesh material.

6. A shopping cart as defined in claim 4 wherein said roller means extends outwardly of said receptacle-forming means at an external angle of substantially 135° to each of said members when said members include an angle of substantially 90° therebetween.

7. A shopping cart as defined in claim 6 wherein said roller means includes at least two ball casters spaced along said edge.

8. A shopping cart as defined in claim 2 wherein said roller means includes a plurality of roller bodies spaced along said edge, at least one of said roller bodies being provided upon each support portion of a respective member, said roller bodies being so disposed and arranged as to be interfitting to permit relatively close juxtaposition of the support portions carrying same in a folded condition of said cart.

9. A shopping cart as defined in claim 8 wherein said roller bodies include at least one pair of generally cylindrical casters rotatable about axes parallel to said edge.

10. A shopping cart as defined in claim 8 wherein each of the support portions carrying a roller body is provided with a recess for receiving the roller body of the other support portion in a folded condition of the cart.

11. A shopping cart as defined in claim 3 wherein said roller means includes a first pair of roller bodies on one support portion and a second pair of roller bodies on another support portion of a respective member, said first pair of roller bodies being offset from the bodies of said second pair in a juxtaposed position of the support portions carrying said bodies whereby said bodies can be interleaved in a folded condition of said cart.

12. A shopping cart as defined in claim 2 wherein said bottom-support member is provided with flap means rearwardly of the respective support portions for displacing articles disposed along said bottom portion forwardly to facilitate tilting of the cart.

13. A shopping cart as defined in claim 2 wherein said roller means is affixed to said wall support member.

References Cited by the Examiner
UNITED STATES PATENTS

| | | | |
|---|---|---|---|
| 2,439,660 | 4/48 | Keil | 280—37 |
| 2,472,203 | 6/49 | Friedmann et al. | 280—36 |
| 2,716,558 | 8/55 | Sullivan | 280—36 |

ARTHUR L. LA POINT, *Primary Examiner.*